June 11, 1935.   P. STEIEN   2,004,839
SHINGLE GAUGE
Filed Feb. 5, 1934
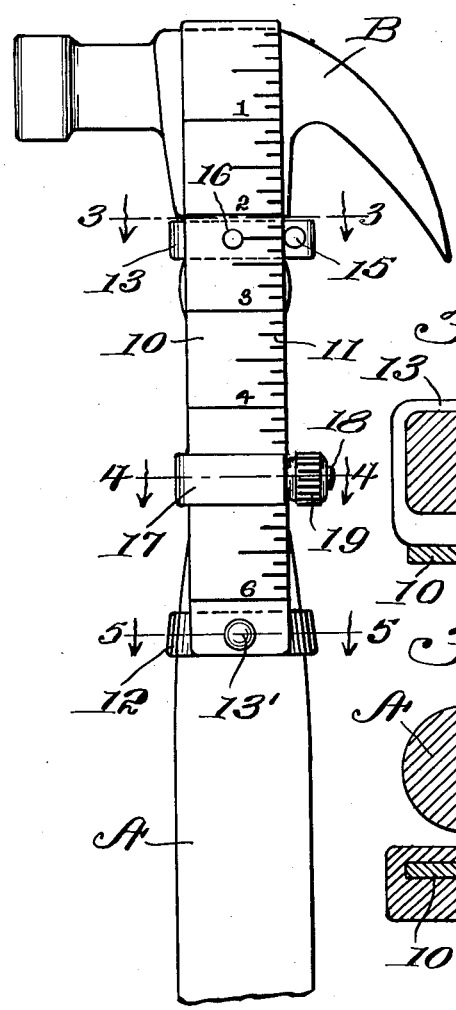
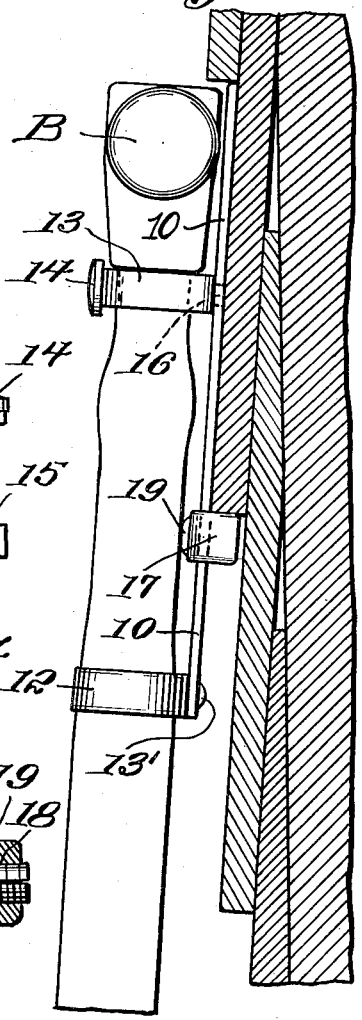
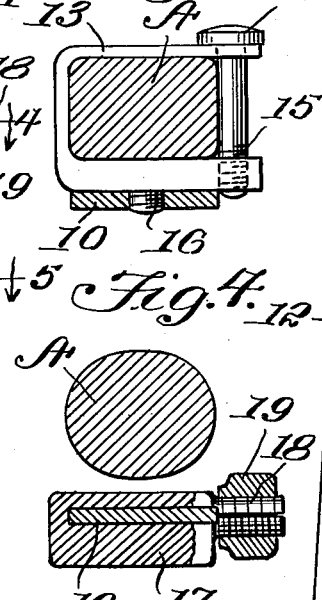
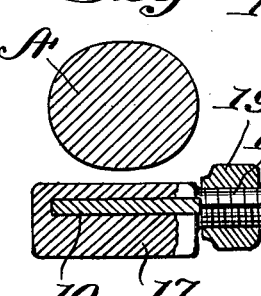
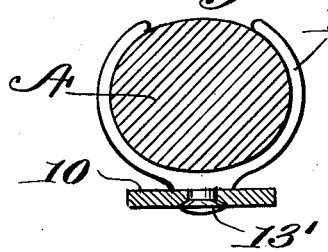
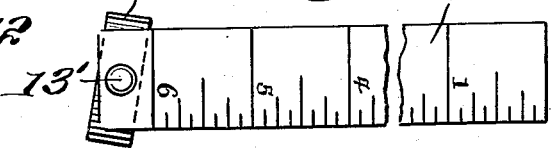
Peder Steien
INVENTOR
BY Victor J. Evans & Co.
ATTORNEY
WITNESS: J. T. L. Wright Patented June 11, 1935

2,004,839

UNITED STATES PATENT OFFICE 2,004,839

SHINGLE GAUGE

Peder Steien, Lancaster, Minn.

Application February 5, 1934, Serial No. 709,844

1 Claim. (Cl. 33—188)

The invention relates to a gauge and more particularly to a lap siding spacer or shingle gauge.

The primary object of the invention is the provision of a gauge of this character wherein the construction thereof is such as to permit its application to a hammer, hatchet or other like implement and when applied is useful in spacing shingles or sideboards commonly known as clapboards and will not interfere with the ordinary use of the hammer or other implement carrying the same, the gauge being adjustable for differences in free board of the shingles.

Another object of the invention is the provision of a gauge of this character wherein the same is readily and easily applied to an implement, such as a hammer, hatchet or the like and when applied will be firmly secure and susceptible of ready and easy use, as well as for adjustment thereof.

A further object of the invention is the provision of a gauge of this character, which is extremely simple in construction, thoroughly reliable and efficient in its purpose, strong, durable, readily and easily adjusted with dispatch, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is a fragmentary side elevation of a hammer showing the gauge constructed in accordance with the invention applied thereto.

Figure 2 is a fragmentary vertical sectional view showing side boards and the gauge applied.

Figure 3 is a sectional view on the line 3—3 of Figure 1 looking in the direction of the arrows.

Figure 4 is a sectional view on the line 4—4 of Figure 1 looking in the direction of the arrows.

Figure 5 is a sectional view on the line 5—5 of Figure 1 looking in the direction of the arrows.

Figure 6 is a fragmentary plan view of the gauge scale bar.

Similar reference characters indicate corresponding parts throughout the several views in the drawing.

Referring to the drawing in detail, A designates generally a portion of a hammer handle and B its head which is of conventional form. The gauge constituting the present invention is also applicable to a hatchet or other implement in lieu of the illustrated hammer, the latter being merely shown to disclose the application and the manner of use of the gauge as will be hereinafter fully described.

The gauge comprises a scale bar 10 having scale graduations 11 of the lineal measurement and this bar can be of any desirable length, preferably made from metal although it may be made from any other suitable material having the required rigidity and strength. The bar 10 carries at one end a clip 12 in the form of a yoke having a swiveled stud 13 connecting it with the bar 10 and this clip is of a resilient character and is slipped onto the handle A of the hammer as shown in Figures 1 and 2 of the drawing. At an intermediate point of the length of the bar 10 is attached a U-shaped clamp 13 carrying a removable bolt 14, the threaded stem portion 15 being tapped into one limb of the clamp 13 while such bolt is loosely passed through the other limb thereof. One limb carries a threaded stud 16 which is engaged in the bar 10 and this clamp embraces the handle A next to the head B of the hammer as is clearly shown in Figures 1 and 2 of the drawing.

The bar 10 when made fast upon the handle A of the hammer will lie at one side thereof and overlap the head.

Slidably fitted on the bar is a member or slide 17, the same being formed with a split threaded shank 18 extending laterally from one end thereof and at one side of the bar 10, while fitted upon this shank is an externally knurled nut 19 so that the slide or member 17 may be secured in its adjusted position on the bar 10, the member or slide 17 constituting a marker to cooperate with the degree graduations 11 of the scale upon the bar 10 for the gauging of the spacing of side boards or shingles in the laying thereof as will be clearly obvious. The manner of use of the gauge will be readily understood. When the first row of shingles has been laid, the hammer A will be laid down upon the shingles with the scale bar next thereto and the slide or member 17 engaging or abutting against the lower edge of the shingle and the head B of such hammer directed upward so that the thick end of the next shingle when placed will abut against the outer end of the scale bar 10 and be in position for nailing.

What is claimed is:

A shingle gauge for hammers comprising a scale bar having a scale marking longitudinally thereof, a resilient clip swiveled to one end of the bar for embracing a handle of the hammer, a U-shaped clamp attached to the bar intermediate of its length and engageable with the handle to protrude the other end of the bar alongside of a head of the hammer, a bolt engaged in the clamp for making fast the same to the handle of the hammer, a split slide fitted on the bar and having a protruding threaded stud extended laterally from the bar, and a binding nut engaged on said stud for rendering the slide fast in adjusted position on the bar.

PEDER STEIEN.